(12) United States Patent
Jasinski et al.

(10) Patent No.: US 8,428,308 B2
(45) Date of Patent: *Apr. 23, 2013

(54) ESTIMATING SUBJECT MOTION FOR CAPTURE SETTING DETERMINATION

(75) Inventors: David Wayne Jasinski, Rochester, NY (US); Bruce Harold Pillman, Rochester, NY (US)

(73) Assignee: Apple Inc., Cupertino, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 13/021,034

(22) Filed: Feb. 4, 2011

(65) Prior Publication Data

US 2012/0201426 A1  Aug. 9, 2012

(51) Int. Cl.
G06K 9/00 (2006.01)
H04N 5/232 (2006.01)

(52) U.S. Cl.
USPC .................. 382/107; 382/291; 348/211.13

(58) Field of Classification Search .................. 382/100, 382/103, 106–107, 168, 173, 181, 220, 232, 382/254, 274, 276, 305, 312, 291; 396/301, 396/55; 348/208.6, 229.1, 208.99, 211.13; 375/240.08
See application file for complete search history.

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 4,774,574 A | 9/1988 | Daley et al. | |
| 5,189,511 A | 2/1993 | Parulski et al. | |
| 5,493,335 A | 2/1996 | Parulski et al. | |
| 5,598,237 A | 1/1997 | McIntyre et al. | |
| 5,652,621 A | 7/1997 | Adams, Jr. et al. | |
| 5,668,597 A | 9/1997 | Parulski et al. | |
| 5,929,919 A | 7/1999 | DeHaan et al. | |
| 6,192,162 B1 | 2/2001 | Hamilton, Jr. et al. | |
| 6,292,218 B1 | 9/2001 | Parulski et al. | |
| 6,934,056 B2 | 8/2005 | Gindele et al. | |
| 7,542,077 B2 | 6/2009 | Miki | |
| 7,546,026 B2 | 6/2009 | Pertsel et al. | |
| 7,657,164 B2 * | 2/2010 | Nomura et al. | 396/55 |
| 7,720,376 B2 * | 5/2010 | Weinberg et al. | 396/301 |
| 7,755,667 B2 * | 7/2010 | Rabbani et al. | 348/208.6 |
| 8,164,651 B2 * | 4/2012 | Hamilton et al. | 348/229.1 |

(Continued)

FOREIGN PATENT DOCUMENTS

| | | |
|---|---|---|
| EP | 1 486 928 | 12/2004 |
| JP | 2004 260717 | 9/2004 |

OTHER PUBLICATIONS

Aroh Barjatya, "Block matching algorithms for motion estimation" IEEE Digital Image Process 6620, pp. 1-6 (2004).

(Continued)

*Primary Examiner* — Seyed Azarian
(74) *Attorney, Agent, or Firm* — Wong, Cabello, Lutsch, Rutherford & Brucculeri LLP

(57) ABSTRACT

A method for determining image capture settings for an electronic image capture device, comprising: capturing at least two preview images of a scene; analyzing the preview images to determine a combined motion velocity; determining one or more image capture settings responsive to the combined motion velocity; and capturing an archival image according to the determined image capture settings. The determination of the combined motion velocity includes: defining a plurality image regions; determining local motion velocities for each of the image regions; and combining the local motion velocities to determine the combined motion velocity.

16 Claims, 11 Drawing Sheets

U.S. PATENT DOCUMENTS

| | | |
|---|---|---|
| 2005/0191729 A1 | 9/2005 | Kaczmarek et al. |
| 2007/0024931 A1 | 2/2007 | Compton et al. |
| 2007/0092244 A1 | 4/2007 | Pertsel et al. |
| 2007/0188617 A1 | 8/2007 | Stavely |
| 2007/0236567 A1 | 10/2007 | Pillman et al. |
| 2007/0237506 A1 | 10/2007 | Minema et al. |
| 2007/0237514 A1 | 10/2007 | Pillman et al. |
| 2008/0024619 A1 | 1/2008 | Ono |
| 2009/0040364 A1 | 2/2009 | Rubner |
| 2009/0237527 A1 | 9/2009 | Mizuno et al. |
| 2009/0244301 A1 * | 10/2009 | Border et al. ............ 348/208.99 |
| 2010/0208087 A1 | 8/2010 | Ogawa |
| 2011/0043639 A1 | 2/2011 | Yokohata |

OTHER PUBLICATIONS

Suh et al., "Fast sub-pixel motion estimation techniques having lower computational complexity," IEEE Transactions Consumer Electronics, vol. 50, pp. 968-973 (2004).

* cited by examiner

ESTIMATING SUBJECT MOTION FOR CAPTURE SETTING DETERMINATION

CROSS-REFERENCE TO RELATED APPLICATIONS

Reference is made to commonly assigned, co-pending U.S. Patent Application Publication No. 2011/0193990, entitled: "Capture condition selection from brightness and motion", by Pillman et al.; to commonly assigned, co-pending U.S. Patent Application Publication No. 2012/0113280, entitled "Automatic engagement of image stabilization," by Stupak et al.; to commonly assigned, co-pending U.S. Patent No. 8,224,176, entitled: "Combined ambient and flash exposure for improved image quality", by Pillman et al.; and to commonly assigned, co-pending U.S. Patent Application Publication No. 2012/0201427, entitled: "Estimating subject motion between image frames", by Jasinski et al., all of which are incorporated herein by reference.

FIELD OF THE INVENTION

This invention pertains to the field of digital imaging, and more particularly to a method for adjusting exposure responsive to motion analysis.

BACKGROUND OF THE INVENTION

Digital cameras consist of hardware components necessary to capture an image along with computational elements required to convert the captured signals to a digital record of the scene. In order to prepare the camera system for capture, all digital cameras have some means for determining exposure settings responsive to scene light level. Conventional solutions for determining exposure settings typically use one or more standardized settings, or respond to operator mode settings to obtain an exposure setting. FIG. 1 shows a flow chart of a typical exposure control system 200 for a digital camera performing autoexposure. In assess scene brightness step 210, the camera assesses the scene brightness either with a scene brightness sensor or with an analysis of a preview image. In determine capture mode step 220, a capture mode setting 225 is determined based on the measured scene brightness and any operator-selected user interface settings or standardized settings. In determine exposure index step 230, the exposure index setting 235 (EI) is determined in accordance with the measured scene brightness and the capture mode setting 225. Those skilled in the art will recognize that exposure index is a standard way to quantify the amount of light necessary for a good exposure. For film-based cameras, the exposure index is usually set based on the film speed, or ISO rating, which is related to the film sensitometry. Conversely, in digital cameras, the exposure index (EI) is often set based on a number of factors including scene brightness, and the effective ISO of the digital camera is adjusted to largely match the EI. In determine aperture step 240, an aperture setting 245 is determined to control the F/# of the camera lens in accordance with the measured scene brightness, the capture mode setting 225 and the exposure index setting 235. An exposure time setting 255 (t) is then determined in determine exposure time step 250 in accordance with the scene brightness, the capture mode setting 225, the exposure index setting 235 and the aperture setting 245. The capture mode setting 225, the exposure index setting 235, the aperture setting 245 and the exposure time setting 255 can be collectively referred to as image capture settings 270.

It should be noted that these steps are not necessarily performed in the order shown in FIG. 1. After the image capture settings 270 have been determined, a capture digital image step 260 is used to capture and store a digital image 265. However, the method of the typical camera control system 200 is prone to capture images with poor perceived image quality because the degree of brightness and motion in the scene can be highly variable and since motion is not taken into account, disappointing levels of motion blur or noise can be present in the images.

Various methods have been employed to determine the optimal combination of the exposure settings responsive to a particular scene. In the simplest implementation, specific values for F/#, EI and t are specified for each light level to produce the Exposure Program Curve for the camera system. More sophisticated implementations may include varying the exposure settings as a function of other factors such as scene type, zoom position and capture mode. For example, it is known that blurring effects due to camera motion (e.g., motion caused by camera shake) is amplified by a longer focal length lens position. Thus many camera exposure programs select shorter exposure times for these long focal length conditions and balance the exposure by increasing EI, using a larger aperture or both. Similar blurring effects occur with excessive subject motion. Many camera systems include an image stabilization system which can significantly reduce but not eliminate the effects of camera motion, however such systems can do nothing about subject motion.

At lower light levels, tradeoffs are typically required to obtain a properly exposed image. Increasing the light by adjusting the aperture setting is generally not an option as the aperture size is nominally set to its maximum by default (i.e., the aperture setting is set at the minimum F/#). Increasing the exposure time setting increases susceptibility to blur, but increasing the EI setting introduces higher levels of image noise. The aforementioned exposure program optimization generally makes some assumptions about camera motion and subject motion, taking into account the effects of zoom and image stabilization, to find the optimal exposure time and ISO tradeoff.

More sophisticated camera systems may compute an estimate of subject motion in order to determine the optimal exposure time. Various methods of estimating motion are available to those skilled in the art, the most common of which is to capture two images separated in time and measure the change in spatial location of objects between frames. One such method is described by De Haan in U.S. Pat. No. 5,929,919, entitled "Motion-compensated field rate conversion." Such methods are heavily exploited in video image processing to reduce the jittering which results from rapid movement of the image from frame to frame. In video systems the average global shift of the frame is generally sufficient for this purpose. For the purpose of exposure program control, a more sophisticated analysis of the various motions within a scene is desirable in order to determine the main subject of interest and thereby determine the ideal exposure time for that object.

U.S. Pat. No. 7,657,164 to Nomura et al., entitled "Subject shake detection device, imaging device, control method thereof, control program, and recording medium," describe the use of gyros and image analysis to estimate camera shake. The exposure time is adjusted to limit motion blur according to a predefined threshold.

U.S. Pat. No. 7,720,376 to Weinberg et al., entitled "Camera with acceleration sensor," teaches a camera with an acceleration sensor. A sensed acceleration is used in the process of determining a minimum shutter speed that should be used for a particular focal length.

U.S. Patent Application Publication 2007/0188617 to Stavely, entitled "Apparatus and method for reducing image blur in a digital camera," teaches determining camera motion information using motion sensors and image analysis. The motion information is used to control the moment of image capture to provide reduced motion blur.

U.S. Patent Application Publication 2007/0237514 to Pillman et al., entitled "Varying camera self-determination based on subject motion," teaches a method for capturing digital images where motion in the scene is measured prior to image capture. Various camera settings are adjusted responsive to the determined scene motion. If little or no scene motion is detected, additional analysis is done to help select a capture mode setting for the digital camera. If rapid scene motion is detected, a capture mode setting suitable for sports photography is selected by the exposure control system. The sports capture mode limits the exposure time and uses a higher exposure index setting than a typical default capture mode. As such, the method of Pullman primarily provides an improved method for capture of scenes with significant scene motion.

In U.S. Patent Application Publication 2007/0237506 to Minema et al., entitled "Image blurring reduction," a camera is described wherein an image is captured at a slower shutter speed if no camera motion is detected. If camera motion is detected, then an image is captured at a faster shutter speed. While this method does reduce motion blur in images, it does not address the combined effects of motion blur and noise in the image on the perceived image quality of the image in selecting capture conditions including exposure time and ISO.

U.S. Pat. No. 5,598,237 to McIntyre et al., entitled "Image capture apparatus," describes an image capture apparatus operable in a hand-held condition and in a stabilized non-hand-held condition. Different exposure parameters are selected depending on whether the camera is being used in the hand-held condition.

U.S. Patent Application Publication 2009/0040364 to Rubner, entitled "Adaptive Exposure Control," teaches using a multiple image capture process to reduce image quality artifacts including motion blur. In capture first image step, a first image is captured using exposure conditions defined by a camera auto exposure control system. In an analyze image for deficiencies step, the first image is analyzed for aspects of image quality such as overexposure, underexposure, motion blur, dynamic range or depth of field to determine which aspects have been met and where deficiencies remain. Based on this analysis, a remaining deficiencies test is used to check whether any deficiencies remain in the aspects of image quality. If some deficiencies remain, the process proceeds to update exposure parameters step where new exposure parameters are set for at least one additional image. A capture additional image step is then used to capture an additional image using the new exposure parameters. The additional image is then analyzed with the analyze image for deficiencies step. This process repeats until the remaining deficiencies test determines that all the aspects of image quality have been met amongst the multiple images that have been captured. A final image is then constructed by combining portions of the multiple captured images using a combine captured images step in such a way that all of the desired aspects of image quality are met. However, the method of Rubner does not address motion related image quality issues in applications which require capturing only a single captured image.

U.S. Patent Application Publication 2007/0236567 to Pillman et al., entitled "Camera and method with additional evaluation image capture based on scene brightness changes," teaches capturing a set of evaluation images of a scene with a digital camera. A change in scene brightness between the evaluation images is determined and when the brightness change is outside a predetermined range; the camera is set to a different capture state prior capturing additional evaluation images of said set. A final camera state for capturing a final image is determined using said set of evaluation images.

U.S. Patent Application Publication 2009/0244301 to Border et al., entitled "Controlling multiple-image capture," teaches determining pre-capture information including motion estimates by analyzing preview images. The method determines whether multiple image capture is appropriate based upon an analysis of the pre-capture information. The multiple images are then synthesized into a single image.

U.S. Pat. No. 7,546,026 to Pertsel, et al., entitled "Camera exposure optimization techniques that take camera motion and scene motion into account," describes exposure optimization using both camera motion and scene motion information. This approach adjusts exposure settings using both global (camera motion) and local (scene motion) estimates. The use of fixed locations for local motion estimates can produce spurious motion estimates in regions of the image with insufficient detail to provide meaningful motion estimates. Additionally, the system is limited in its ability to respond automatically to scene content; in particular, it has no ability to account for differences in the location of the main subject and the amount of scene detail.

There remains a need for a method to adjust image capture settings for an electronic image capture device to provide improved image quality for images containing moving objects.

SUMMARY OF THE INVENTION

The present invention represents a method for determining image capture settings for an electronic image capture device, comprising:

capturing a set of at least two preview images of a scene at different capture times using the electronic image capture device;

using a processor to analyze the set of captured preview images to determine a combined motion velocity for the scene;

determining one or more image capture settings responsive to the combined motion velocity;

capturing an archival image with the electronic image capture device according to the determined image capture settings; and storing the captured archival image in an image memory;

wherein the process of determining the combined motion velocity for the scene includes:

selecting a plurality of image regions corresponding to subsets of image pixels within the captured preview images, wherein at least one of the image regions is selecting by automatically analyzing the set of captured preview images;

determining local motion velocities for each of the image regions; and combining the local motion velocities to determine the combined motion velocity.

This invention has the advantage that image capture settings used to capture a digital image are optimized relative to a combined motion estimate, wherein the combined motion estimate is determined by automatically analyzing a preview image to identify a set of image regions that are likely to be important to the photographer. In this way, the image capture settings can be determined in a manner that accounts for the image motions that are most likely to affect perceived image quality.

Figure 1:
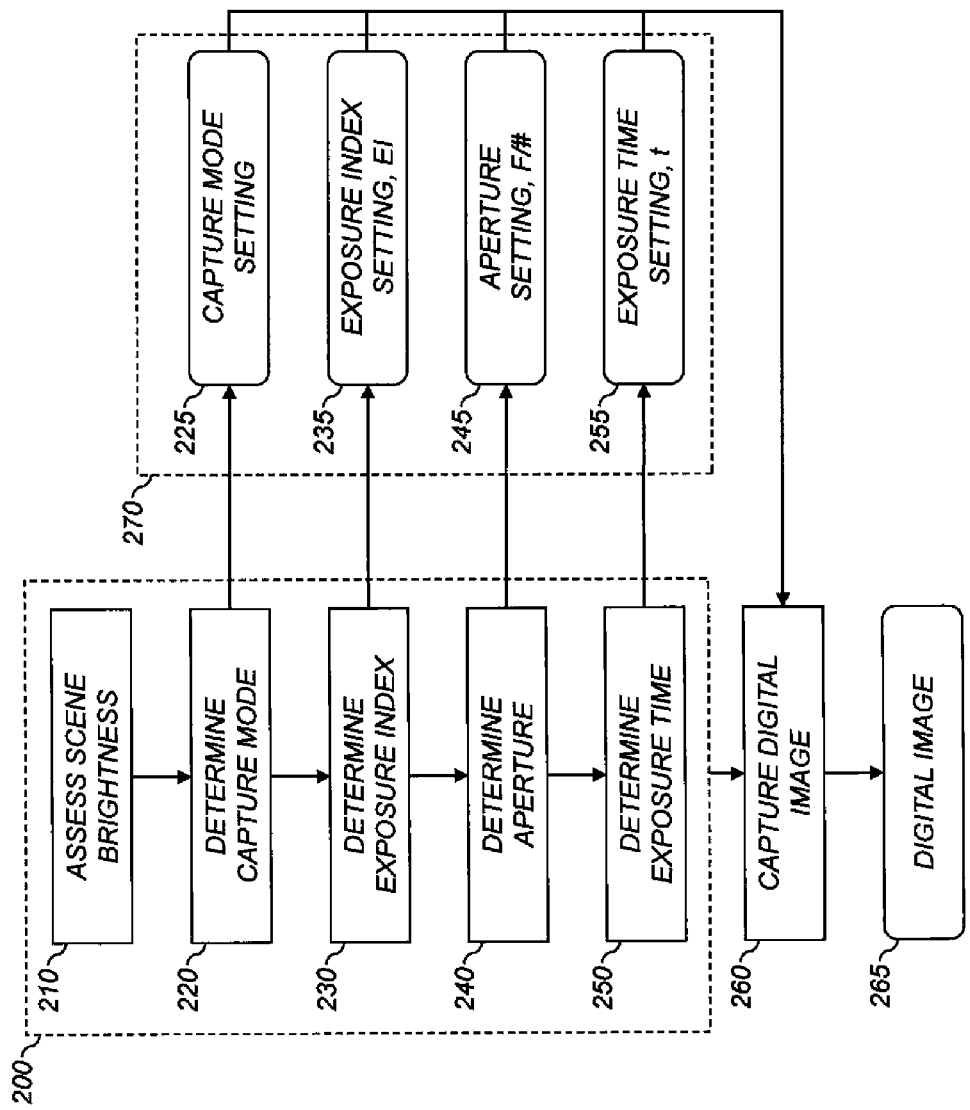
FIG. 1 is a flowchart illustrating a method for controlling exposure according to prior art.

It is to be understood that the attached drawings are for purposes of illustrating the concepts of the invention and may not be to scale.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

Figure 2:
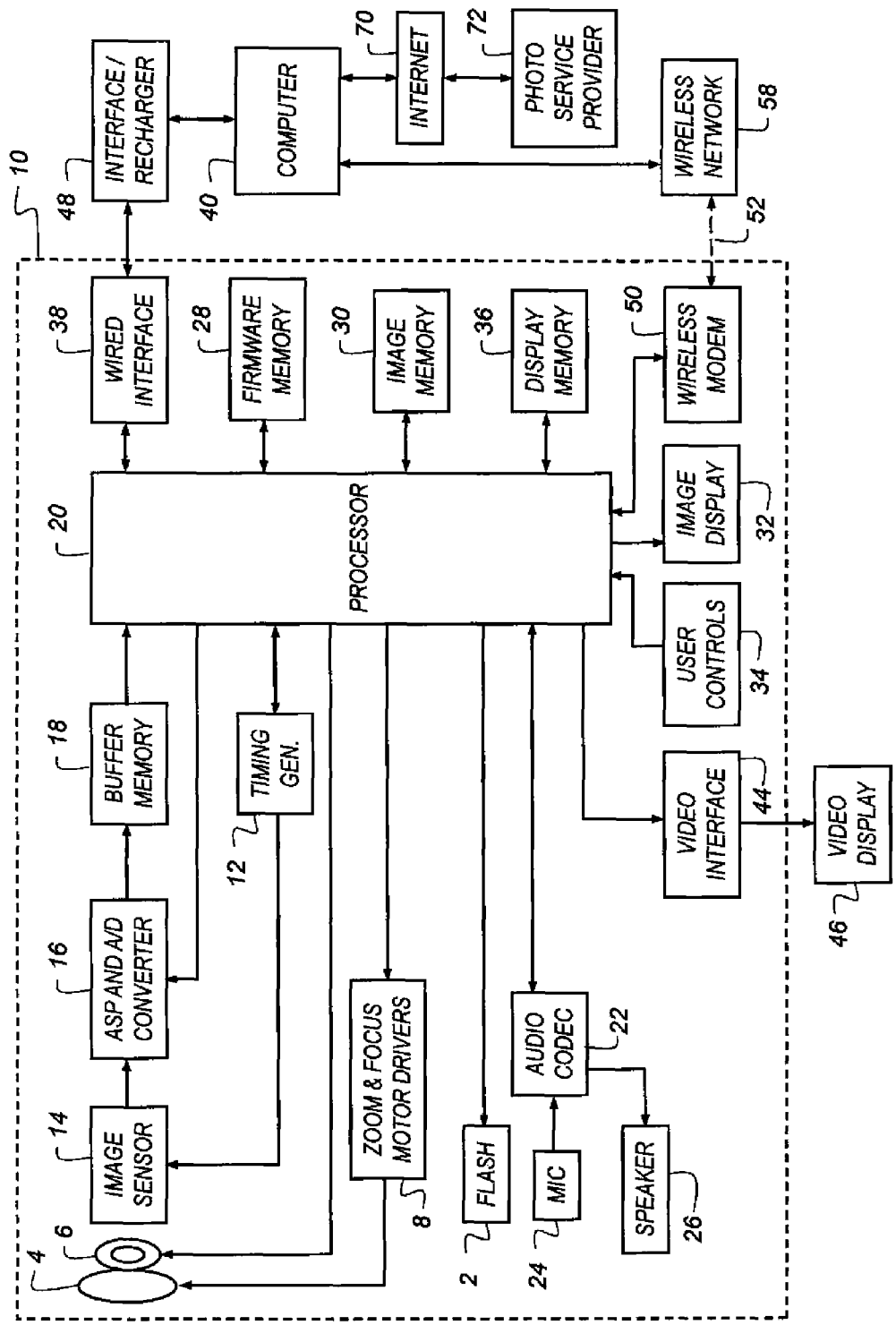
FIG. 2 is a high-level diagram showing the components of a digital camera system.

FIG. 2 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 2 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity," the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 2, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the F/# and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene. As will be described in more detail later, the F/# and the exposure time, as well as the flash setting are preferably determined responsive to a detected motion velocity according to a preferred embodiment.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still images, recording of motion images. The user controls 34 are also used to set user processing preferences, and to choose between various photography modes based on scene type and taking conditions. In some embodiments, various camera settings may be set automatically in response to analysis of preview image data, audio signals, or external signals such as GPS, weather broadcasts, or other available signals.

In some embodiments, when the digital camera is in a still photography mode the above-described preview mode is initiated when the user partially depresses a shutter button, which is one of the user controls 34, and the still image capture mode is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a means to receive input from the user or an external device via a tethered, wireless, voice activated, visual or other interface. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be used to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak Easy-Share Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 3:
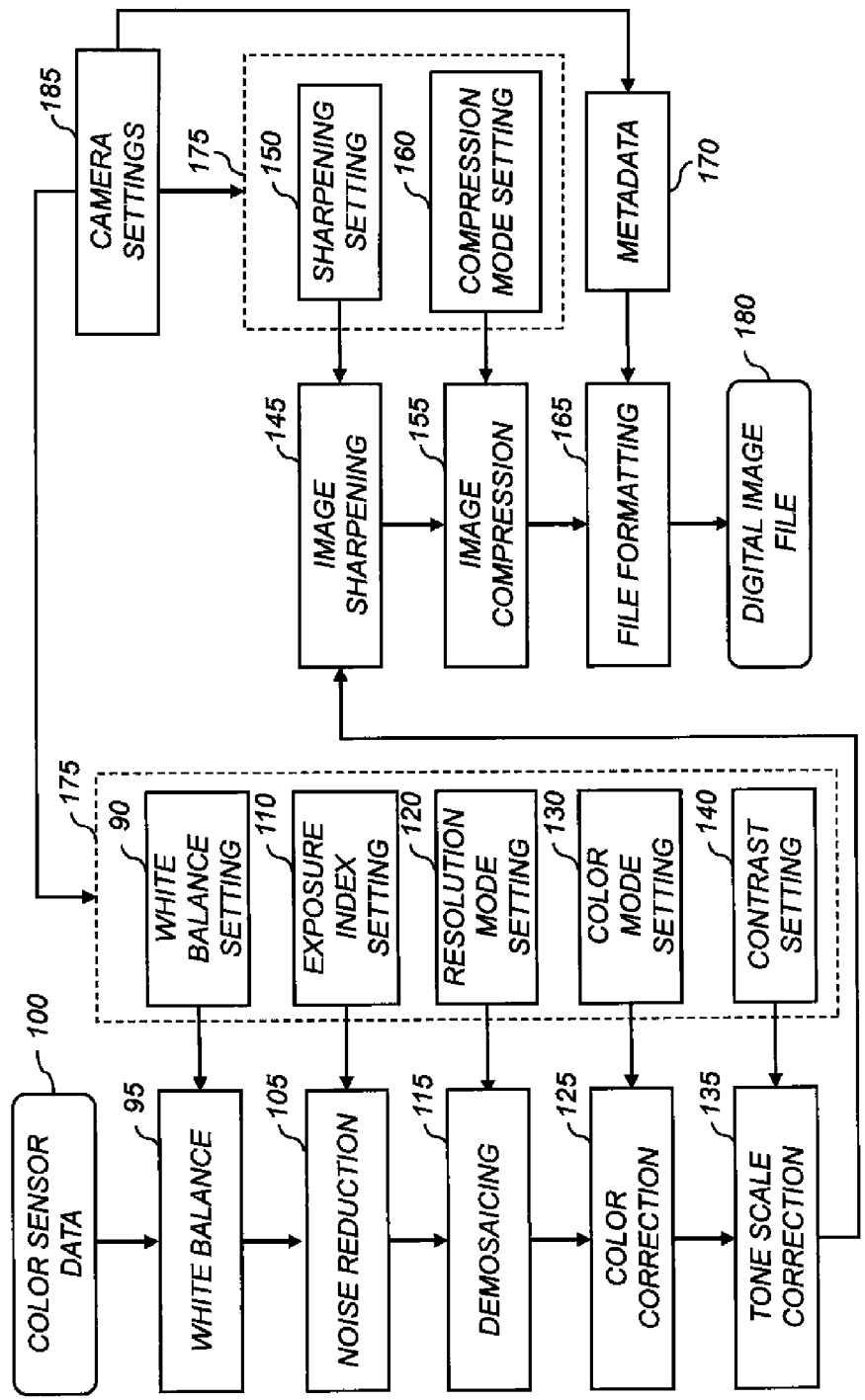
FIG. 3 is a flow diagram depicting typical image processing operations used to process digital images in a digital camera.

FIG. 3 is a flow diagram depicting image processing operations that can be performed by the processor 20 in the digital camera 10 (FIG. 2) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32. As will be described later, one or more of the photography mode settings 175 (e.g., an exposure index setting 110) and the camera settings 185 (including the image capture settings 270 from FIG. 1) are adjusted responsive to a determined motion velocity according to a preferred embodiment.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Mild, entitled "White balance adjustment device and color identification device", the disclosure of which is herein incorporated by reference. The white balance can be adjusted in response to a white balance setting 90, which can be manually set by a user, or which can be automatically set by the camera.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to the exposure index setting 110, so that more filtering is performed at higher exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including the photography mode settings 175.

Figure 4:
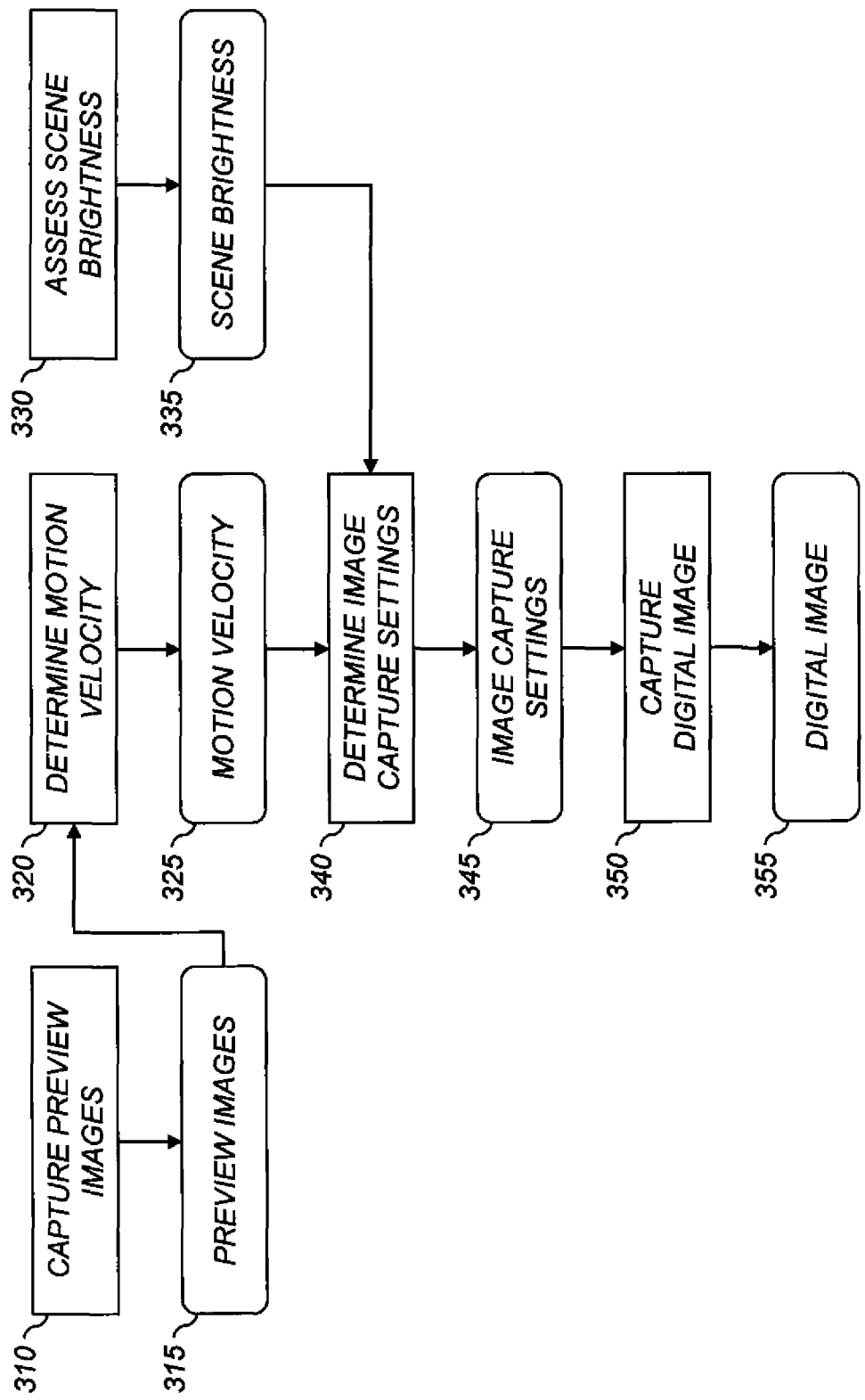
FIG. 4 is a flowchart illustrating a method for determining image capture settings for capturing a digital image according to a preferred embodiment.

FIG. 4 is a flow diagram depicting the operations performed in the determination of camera exposure settings according to a preferred embodiment. A capture preview images step 310 is used to capture a plurality of preview images 315. In some embodiments, the preview images 315 can be the same image data that are used to provide real-time images for display on the image display 32 (FIG. 2) during the image composition process. In other embodiments, the preview images 315 can come from a video image stream or other non-displayed image capture subsystem providing image data that are representative of the image that will ultimately be captured.

In a preferred embodiment the set of preview images 315 includes two images captured at different capture times. In other embodiments, a larger number of preview images 315 can be used. Generally, the digital camera will be capturing a continuous stream of images during the image composition process, and the preview images 315 will be selected to correspond to the most recent images that have been captured prior to a user initiating an image capture process.

In some embodiments, the preview images 315 may be raw, full resolution images directly from the image sensor 14 (FIG. 1). In a preferred embodiment, the preview images 315 will have undergone a series of image processing operations in order to provide a more optimal rendition of the image for motion analysis. The image processing operations can include, but are not restricted to, demosaicing, color management, resizing, conversion to grayscale, contrast adjustment, and spatial enhancement.

A determine motion velocity step 320 is used to analyze the preview images 315 to determine a motion velocity 325. Additional details for the determine motion velocity step 320 will be described later.

A determine image capture settings step 340 determines image capture settings 345 responsive to the motion velocity 325, together with a scene brightness 335 determined using an assess scene brightness step 330. The assess scene brightness step 330 can use any method known in the art to determine the scene brightness 335. For example, one or more of the preview images 315 can be analyzed to estimate the scene brightness 335. Alternately, a dedicated light sensor can be used to estimate the scene brightness. The image capture settings 345 can include the capture mode setting 225, the exposure index setting 235, the aperture setting 245, or the exposure time setting 255 shown in FIG. 1, or combinations thereof. The image capture settings 345 can also include other settings such as the photography mode settings 175 with reference to FIG. 3, that are used to control the performance of various image processing operations.

In a preferred embodiment, the determine image capture settings step 340 uses the method described in commonly assigned, co-pending U.S. patent application Ser. No. 12/701,659, entitled: "Capture condition selection from brightness and motion", by Pillman et al., which is incorporated herein by reference. This method involves calculating a ratio of the scene brightness 335 to the motion velocity 325. The ratio is then used to select a capture mode setting, an exposure index setting and an exposure time setting that is used to capture an archival image.

In other embodiments, the image capture settings 345 can be determined using a series of different "program curves." The program curves specify various image capture settings 345 (e.g., exposure index setting 235, aperture setting 245 and exposure time setting 255 as shown in FIG. 1) as a function of the scene brightness 335. According to the present invention, different sets of program curves can be provided for use with different ranges of motion velocities 325. For example, a set of program curves can be provided for a low range of motion velocities, a moderate range of motion velocities, and a high range of motion velocities. In some embodiments, different sets of program curves can also be provided for use with different lens zoom positions, scene types, camera program modes or other conditions.

Once the image capture settings 345 have been determined, a capture digital image step 350 is used to capture a digital image 355 in response to user activation of an appropriate user control 34 (FIG. 2). Often the digital image 355 is referred to as an archival digital image because this image is stored (i.e., "archived") in image memory 30 (FIG. 2) for later use.

Figure 5:
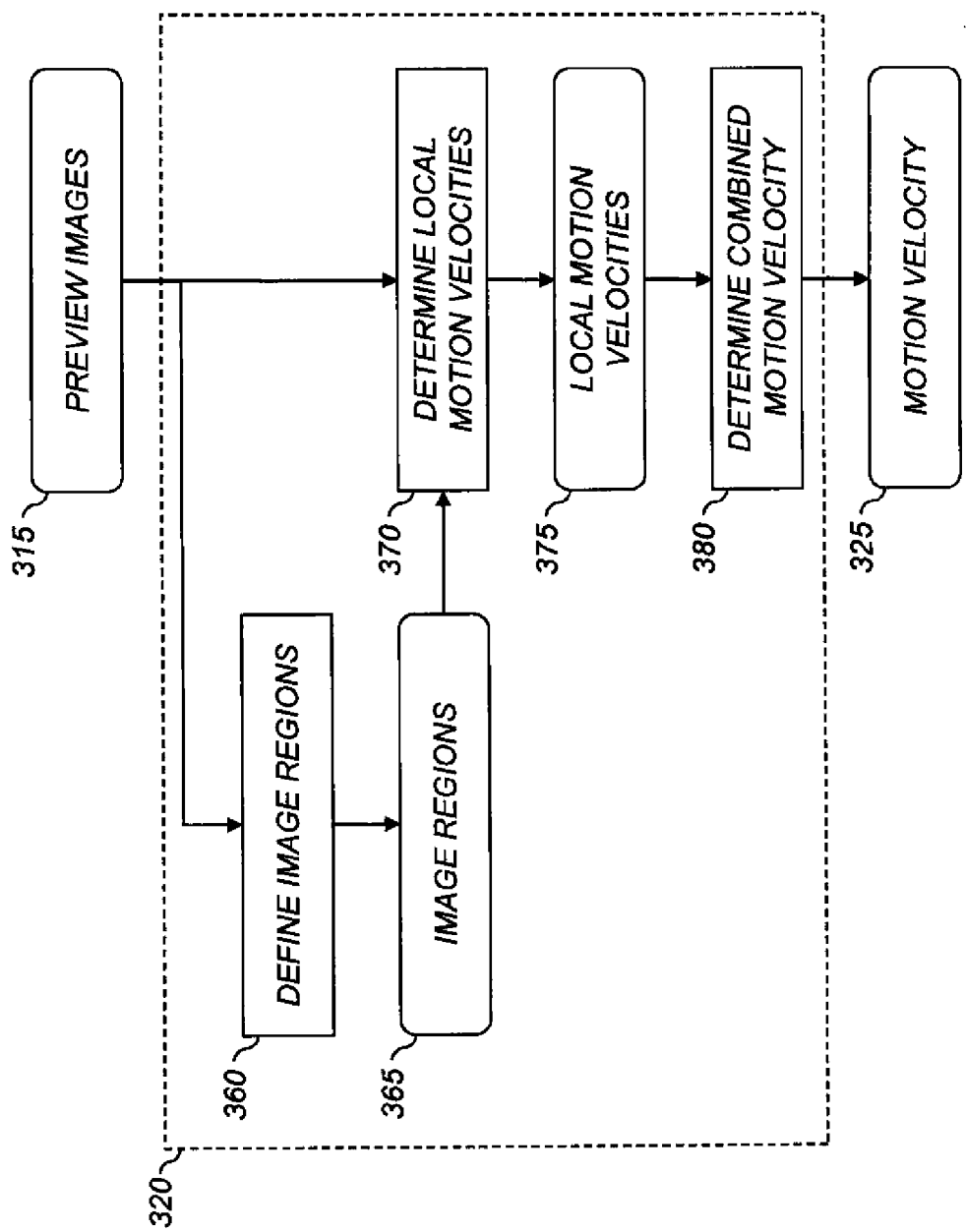
FIG. 5 is a flowchart illustrating a preferred embodiment of the determine motion velocity step in FIG. 4.

FIG. 5 illustrates a flow chart showing additional details for the determine motion velocity step 320 according to a preferred embodiment. A define image regions step 360 is used to define a set of image regions 365. The image regions 365 correspond to subsets of the image pixels in the preview images 315. More details about how the image regions 365 can be defined will be discussed later.

A determine local motion velocities step 370 is used to determine local motion velocities 375 for each of the image regions 365. As will be discussed later, the local motion velocities 375 are preferably determined by determining spatial offsets between the pixels of the preview images 315 within the image regions.

A determine combined motion velocity step 380 is used to combine the local motion velocities 375 to determine the motion velocity 325. In a preferred embodiment, the motion velocity 325 is determined by computing a weighted summation of the local motion velocities 375. As will be described later, weighting values for each of the local motion velocities 375 can be determined according to a number of different criteria including position of the image region 365, image noise, and confidence of the motion vector calculation.

Figure 6:
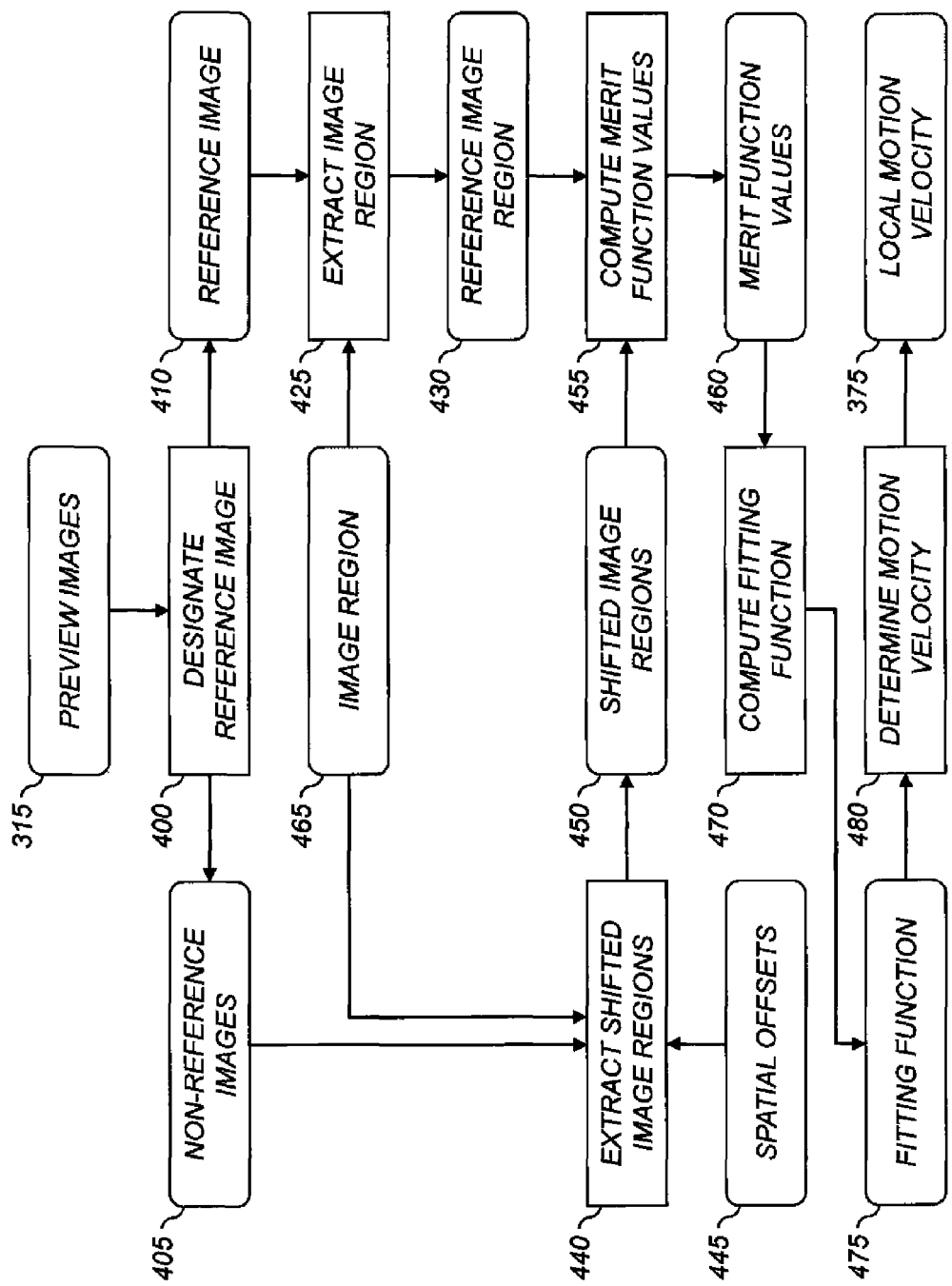
FIG. 6 is a flowchart illustrating a method for determining a local image motion with sub-pixel accuracy.

FIG. 6 illustrates a flow chart showing a method for calculating a local motion velocity 375 that can be used as part of the determine local motion velocities step 370 according to a preferred embodiment. A designate reference image step 400 is used to designate one of the preview images 315 to be a reference image 410. The rest of the preview images 315 are designated to be non-reference images 405. For the case where there are only two preview images 315, there will be only a single non-reference image.

An extract image region step 425 is used to extract a reference image region 430 from the reference image 410 corresponding to a particular image region 465. The image region 465 corresponds to a particular one of the image regions 365 in FIG. 5. The image region 465 is defined by a bounding box enclosing a set of image pixels. In a preferred embodiment, the image region 465 contains a 16×16 block of image pixels, which is a standard block size used in video analysis algorithms. However, image regions 465 having any arbitrary size or shape can be used in accordance with the present invention. The extract image region step 425 extracts the pixels in the reference image 410 that fall within the defined image region 465.

Similarly, an extract shifted image regions step 440 is used to extract a set of corresponding shifted image regions 450 from the non-reference images 405 according to a set of predefined spatial offsets 445. The spatial offsets 445 include horizontal and vertical offset values, each of which correspond to an integer number of pixels. In one embodiment, an array of different horizontal and vertical spatial offset values can be used corresponding to every possible combination of horizontal and vertical shifts within some range (e.g., +/−7 pixels). In a preferred embodiment, only a subset of the possible combinations of horizontal and vertical shifts are evaluated by using a search strategy to focus in on the most promising spatial offsets 445. For example, the ARPS search strategy disclosed in the article by Aroh Barjatya entitled "Block matching algorithms for motion estimation" (IEEE Digital Image Process 6620, pp. 1-6, 2004) can be used in accordance with the present invention. Each spatial offset 445 is applied to the image region 465 to define a shifted image region 450 which is extracted from each of the non-reference images 405.

For the case where there is more than one non-reference image 405, it may be desirable to apply different spatial offsets 445 for each of the different non-reference image 405, such that the spatial offsets 445 are scaled proportionally to the time difference between the capture time of the reference image 410 and the non-reference image 405. For example, if the reference image 410 is captured at a time $t_0$, and a pair of non-reference images 405 are captured at times $t_0-\Delta t$ and $t_0-2\Delta t$, then the spatial offsets 445 applied to the second non-reference image 405 can be scaled to be twice as large as the spatial offsets 445 applied to the first non-reference image 405 assuming that the motion is linear.

A compute merit function values step 455 is used to compute merit function values 460 responsive to the reference image region 430 and the shifted image regions 450, wherein the merit function values 460 are an indication of an amount of difference between the reference image region 430 and the shifted image regions 450. In a preferred embodiment, the merit function values 460 are determined by calculating the mean absolute difference between the pixels of the reference image region 430 and the shifted image regions 450. For the case where there are more than one non-reference image 405, individual merit function values can be determined for the shifted image regions 450 extracted from each of the non-reference images 405, and the individual merit function values can be combined to determine a single merit function value.

For the case where the spatial offsets 445 that are evaluated are determined according to a search strategy such as ARPS, a merit function value 460 will generally be determined after each search iteration and will be used to guide the search strategy in order to define the next set of spatial offsets 445 that will be evaluated. In this way, the extract shifted image regions step 440 and the compute merit function values step 455 are applied iteratively rather than serially.

A compute fitting function step 470 is used to compute a fitting function 475 having a predefined functional form at least a subset of the computed merit function values 460. The fitting function 475 provides an estimated merit function value as a function of spatial offset. In a preferred embodiment, the iterative search strategy discussed above is used to determine the integer spatial offset 445 that produces the smallest merit function value (e.g., $\Delta x_0$, $\Delta y_0$). The compute fitting function step 470 is then used to determine the fitting function 475 in a local neighborhood around this offset value. In one embodiment, this is done by first refining the horizontal offset $\Delta x$, and then refining the vertical offset $\Delta y$, to determine offset values having a sub-pixel accuracy.

To refine the horizontal offset horizontal offset $\Delta x$, a fitting function is computed based on merit function values 460 determined at spatial offsets correspond to $\Delta x_0-1$, $\Delta x_0$, and $\Delta x_0+1$ (using the nominal vertical offset value of $\Delta y_0$). In a preferred embodiment, the fitting function 475 has a parabolic functional form:

$$M = A_0 + A_1 \Delta x + A_2 \Delta x^2 \qquad (1)$$

where $A_0$, $A_1$ and $A_2$ are fitting coefficients, and M is the merit function value.

Figure 7:
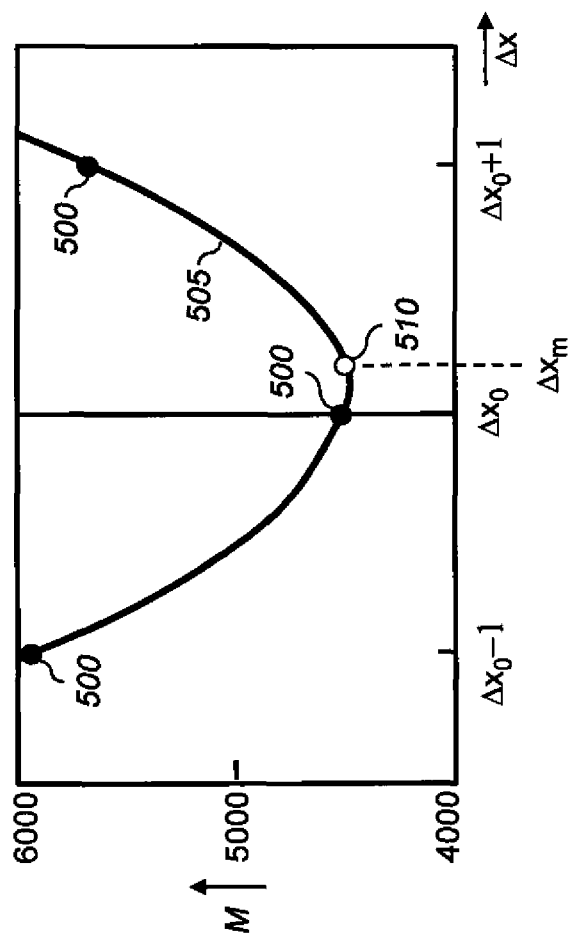
FIG. 7 is a graph showing a fitting function determined for a set of merit function values.

FIG. 7 illustrates three measured points 500 corresponding to the merit function values 460 computed at the spatial offsets $\Delta x_0-1$, $\Delta x_0$, and $\Delta x_0+1$. A fitting function 505 is shown which was determined by fitting the measured points 500 using the functional form of Eq. (1). The compute fitting function step 470 can determine the coefficients of the parabolic fitting function using any fitting method known in the art. For example, the coefficients can be determined using a least-squares regression method.

Returning to a discussion of FIG. 6, a determine motion velocity step 480 is used to determine the local motion velocity 375 responsive to the determined fitting function 475. In a preferred embodiment, this is accomplished by finding the local minimum of the fitting function 475. (In some embodiments, the merit function can be defined such that larger merit function values indicate a higher degree of similarity between the reference image region 430 and the shifted image regions 450. In this case, the local maximum of the fitting function 475 is determined rather than the local minimum.).

In a preferred embodiment, the local minimum of the fitting function is determined directly from the mathematical function using well-known function minimization methods. For the case where the functional form of the fitting function is given by the parabolic function in Eq. (1), the local minimum can be determined by differentiating the equation with respect to the spatial offset and setting the derivative equal to zero. In this way, the spatial offset corresponding to the local minimum of the fitting function ($\Delta x_m$) is found to be:

$$\Delta x_m = -A_1/2A_2 \qquad (2)$$

In general, the spatial offset at the local minimum $\Delta x_m$ will be a non-integer value, falling between the measured points 500, which occur at spatial offset values corresponding to an integer number of pixels. In this way, the spatial offsets between the image regions can be determined with sub-pixel accuracy. In FIG. 7, the local minimum of the fitting function 505 is shown as the minimum point 510, having a spatial offset of $\Delta x_m$ as calculated by Eq. (2).

A spatial offset in the vertical direction $\Delta y_m$ can be determined using an analogous process by determining a fitting function based on merit function values 460 determined at spatial offsets correspond to $\Delta_0-1$, $\Delta y_0$, and $\Delta y_0+1$ (using the nominal vertical offset value of $\Delta y_0$).

In some embodiments, it may not be necessary to determine the horizontal and vertical spatial offsets with a sub-pixel accuracy. In these cases, rather than determining fitting functions and corresponding local minima, the horizontal and vertical spatial offsets can be determined by simply finding the integer spatial offsets producing to the smallest merit function value 460. These values will be accurate to within a single pixel position.

The horizontal and vertical spatial offsets can then be combined to determine a total spatial offset. In a preferred embodiment, the horizontal and vertical spatial offsets are combined according to the following equation:

$$\Delta d = \sqrt{\Delta x_m^2 + \Delta y_m^2} \qquad (3)$$

where $\Delta d$ is the total spatial offset.

The total spatial offset will be proportional to the local motion velocity, and can therefore be used as a representation of the local motion velocity in the calculation of the image capture settings 345 (FIG. 4). For applications where it is desirable to calculate the local motion velocity in actual velocity units, the total spatial velocity can be scaled by the time interval between the capture time of the reference image 410:

$$V_L = \Delta d / \Delta t \qquad (4)$$

where $V_L$ is the local motion velocity, and $\Delta t$ is the time interval between the capture times. Generally, the total spatial offset will be determined in units of pixels. In this case, the local motion velocity will be in units of pixels per second. However, the local motion velocity can be converted to any other velocity units as appropriate.

Returning now to a discussion of FIG. 5, the set of image regions 365 that are used for the determination of the local motion velocities 375 can be determined using many different strategies. For example, image regions 365 can be defined at a series of predefined locations distributed throughout the preview images 315.

In a preferred embodiment, at least some of the image regions 365 are determined by automatically analyzing one (or more) of the preview images 315. For example, many digital cameras 10 (FIG. 2) use autofocus algorithms to analyze the preview images 315 in order to adjust the focus position of the lens 4 (FIG. 2). Autofocus algorithms commonly identify a focus region that they believe to correspond to a main subject in the scene. The focus region is desirable to use as one of the image regions 365 for several reasons. First, the focus region is likely to correspond to one of the most important regions in the scene. Additionally, the focus region is likely to contain image detail that can be used to reliably detect motion since it should be well focused.

In some embodiments, a face detection algorithm can be used to detect the presence of a face within the preview image 315 and to identify the location of the face. In some embodiments, the entire face region can be designated to be an image region 365. In a preferred embodiment, one or more image regions are defined corresponding to subsets of the face region. For example, a 12×12 region in the center of the face region can be designated as one of the image regions 365. Similarly, other image regions 365 can be designated at a series of locations within the face region (e.g., at the location of key features such as the person's eyes).

Since the motion velocity 325 can generally be determined more accurately for image regions 365 having a high level of scene detail, some embodiments can choose some or all of the image regions 365 by analyzing the preview images 315 to identify image regions having a high level of scene detail. Scene detail can be determined using any method known in the art. For example, a local image variance, or an image gradient metric can be used to provide a measure of scene detail in a local image region.

Similarly, the local scene brightness level can also be an indication of the suitability of an image region. Objects within a mid-to-high scene brightness range will generally be more important to the photographer. Additionally, the choice of image regions with a higher local brightness level avoids areas where low signal-to-noise can interfere with the calculation of accurate motion velocities. Ideally, the selected image regions should have both a high level of scene detail and a high level of scene brightness.

In other embodiments, one or more of the image regions 365 are determined by analyzing the preview images 315 to identify image areas where there are significant differences between the reference image 410 (FIG. 6) and the non-reference images 405 (FIG. 6). Such image areas generally correspond to moving objects, and are therefore good candidates for regions of interest that are useful for determining local motion velocities 375.

Figure 8:
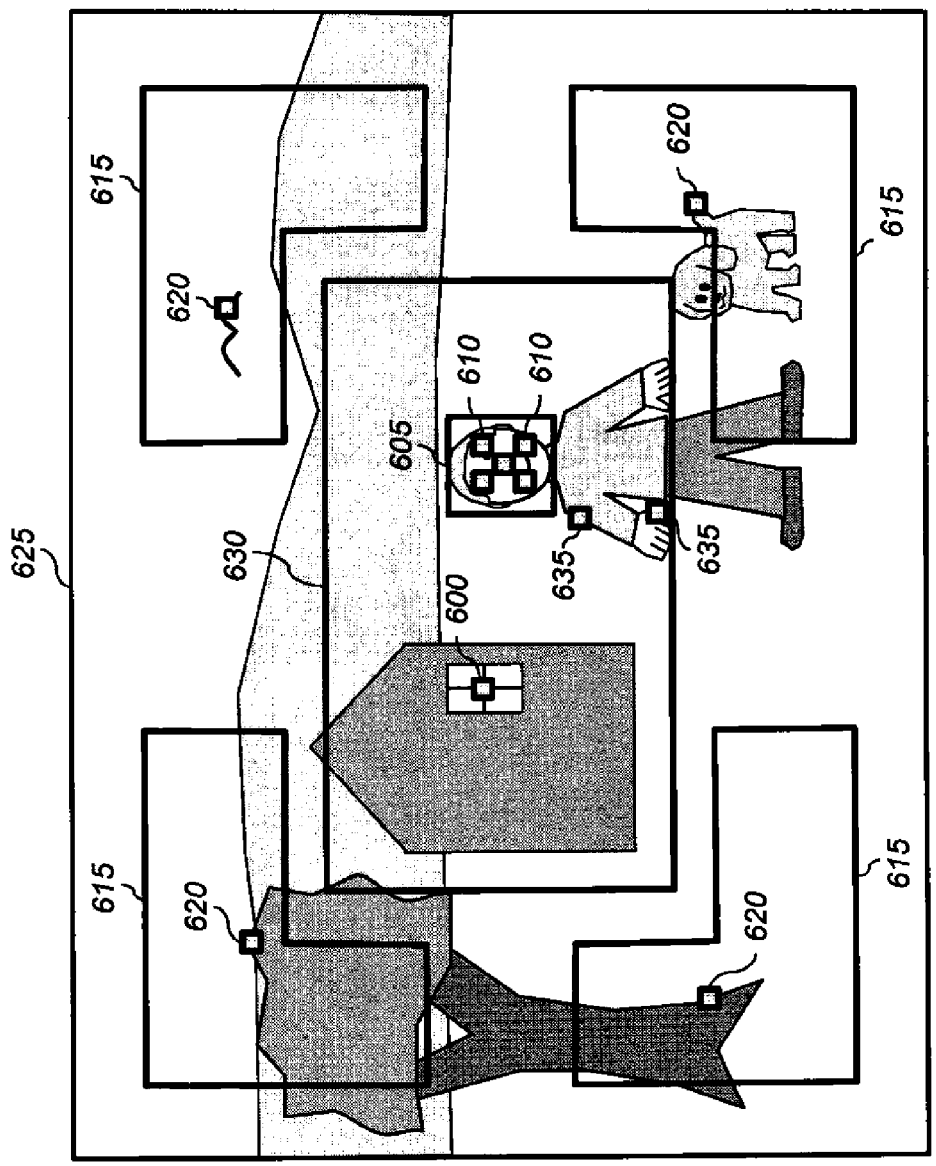
FIG. 8 illustrates the selection of image regions useful for determining a motion velocity.

FIG. 8 shows an illustration of a preview image 625 that can be used in the process of determining a motion estimate. In this example, a set of image regions are selected using several different strategies. An image region 600 corresponds to the focus region selected by an auto-focus algorithm.

A face zone 605 shows a bounding box around a face identified using an automatic face detection algorithm. Five image regions 610 are shown within the face zone 605. The image regions 610 are positioned at predefined locations within the face zone 605—one in the center of the face zone 605, and four positioned around the center.

In a preferred embodiment, image regions are selected in a number of predefined zones. Any number of shapes and locations of these predefined zones can be used. In FIG. 8, a central zone 630 is positioned in the center of the preview image 625. The pixels within the central zone 650 are analyzed to identify one or more image region 635 using the above-described criteria. In a preferred embodiment, a plurality of criteria (e.g., level of scene detail, local scene brightness level, and degree of difference from reference image) are evaluated and combined to select appropriate image regions 635. Similarly, four peripheral zones 615 are positioned toward the corners of the preview image 625. The pixels within each peripheral zone 615 are similarly analyzed to identify image regions 620.

Returning to a discussion of FIG. 5, once a set of image regions 365 have been defined, a local motion velocity for each one is determined using the determine local motion velocities step 370 as described above. The determine combined motion velocity step 380 is the used to determine the motion velocity 325. In a preferred embodiment, the determine combined motion velocity step 380 determines the motion velocity 325 (V) by forming a weighted combination of the local motion velocities 375:

$$V = \sum_i w_i V_{L,i} \tag{5}$$

where $V_{L,i}$ is the local motion velocity 375 for the $i^{th}$ image region 365, and $w_i$ is a corresponding weighting coefficient.

The weighting coefficients $w_i$ can be determined using any method known in the art. In a preferred embodiment, the weighting coefficients $w_i$ are determined to be representative of the estimated relative importance of the image regions to a user. There are several attributes that can be considered in the determination of the relative importance. For example, image regions 365 in a face zone or an autofocus zone can be weighted more highly than other image regions 365 because they are more likely to be a main subject, and therefore are likely to be of higher importance to the photographer. Likewise, image regions 365 located in the periphery of the preview images 315 can be deemed to be of lower relative importance than those which are centrally located. Extra weight can also be given to the central portion of the preview images 365 by selecting a larger number of image regions 365 toward the center of the preview images 315.

Other factors can also be used to determine the weighting coefficients $w_i$. For example, image regions 365 with high levels of image detail can be weighted more highly than image regions 365 with lower levels of image detail, reflecting the fact that this image regions 365 are likely to be of more importance to the photographer.

Figure 9:
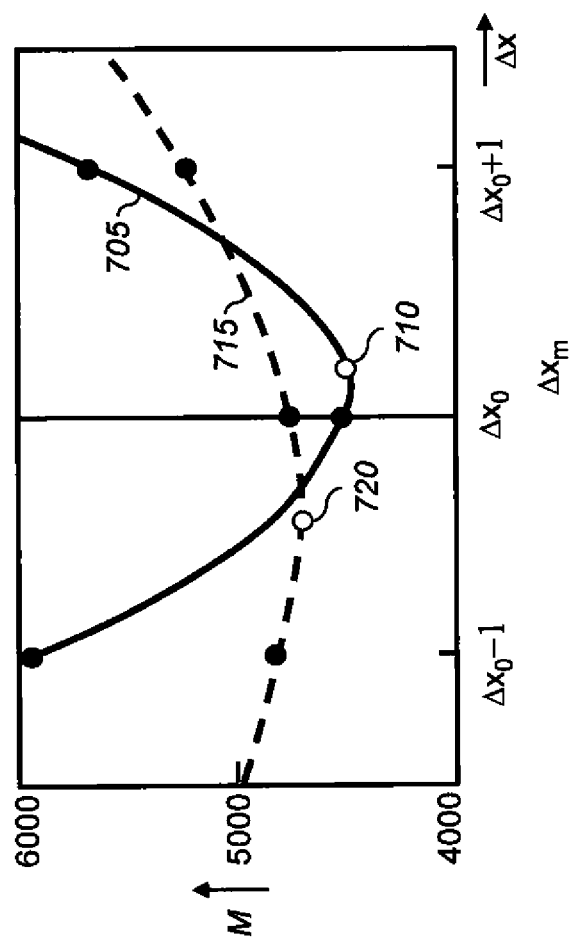
FIG. 9 is a graph showing two fitting functions having local minima with different second derivatives.

Another factor that determine the weighting coefficients $w_i$ is a relative confidence level associated with the local motion velocity 375. For embodiments where the method of FIG. 6 is used to determine the local motion velocity, the shape of the fitting function 475 can provide an indication of the relative confidence level. FIG. 9 shows fitting functions 475 (FIG. 6) determined for two different image regions. Fitting function 705, having a minimum point 710, corresponds to the fitting function 505 in FIG. 7. Fitting function 715, having a minimum point 720, corresponds to a different image region. It can be seen that the fitting function 715 has a shallower local minimum than the fitting function 705, which has a steeper local minimum. It will be apparent to one skilled in the art that the steepness of the local minimum is a measure of the confidence level associated with the determined local motion velocity. A shallower local minimum implies that there is very little difference in the merit function value (i.e., in the degree of correlation between the reference image region 430 and the shifted image region 450) as a function of the spatial offset 445 (FIG. 6). Therefore, there is a lower confidence in the correct position of the local minimum, and in the magnitude of the resulting local motion velocity estimate. A measure of the shallowness of the local minimum will be the value of the second derivative of the fitting function (i.e., the concavity) at the local minimum. For the parabolic fitting function of Eq. (1), it can be seen that the value of the second derivative will be proportional to the fitting coefficient $A_2$. Therefore, image regions having where the determined fitting function has a higher $A_2$ value, can be weighted more highly than image regions having a lower $A_2$ value.

In other embodiments, the confidence level associated with the local motion velocity 375 can be determined responsive to one or more statistics determined from the computed merit function values. Various statistics that can be useful for determining the confidence level associated with the local motion velocity 375 would include a minimum merit function value, a mean of the merit function values, a range of the merit function values, a standard deviation of the merit function values, a first derivative of the merit function values with respect to spatial offset or a second derivative of the merit function values with respect to spatial offset. For example, if the merit function values determined across the range of spatial offsets have a low range or small standard deviation, this would be an indication that there would be a relatively low confidence level associated with the local motion velocity 375 since there will not be a distinct minimum in the merit function values.

Another statistic that can be useful is to determine a ratio of the minimum merit function value to the mean merit function value. If the merit function values have a low minimum value, and a correspondingly low ratio, this is an indication that there is a good match between the between the reference image region 430 and the shifted image region 450.

In some embodiments, a second derivative value of the merit function values can be estimated directly from the merit function values using well-known numerical analysis techniques without the determination of a fitting function. For example, a second derivative in the x-direction at a particular offset value $\Delta x_0$ can be estimated by computing a difference between first derivative values calculated for adjacent spatial offsets. In equation form, the second derivative can be calculated as:

$$\frac{\partial^2 M(\Delta x_0)}{d\Delta x^2} \approx \frac{\partial M(\Delta x_0 + 1/2)}{d\Delta x} - \frac{\partial M(\Delta x_0 - 1/2)}{d\Delta x} \qquad (6)$$
$$\approx M(\Delta x_0 + 1) - 2M(\Delta x_0) + M(\Delta x_0 - 1)$$

where $M(\Delta x)$ is the determined merit function value as a function of the spatial offset in the x-direction. In some embodiments, the merit function value as a function of the spatial offset can be smoothed using any smoothing technique known in the art to reduce random variations prior to calculating the one or more statistics.

Local scene brightness level can also be a predictor of a relative confidence level associated with the local motion velocity 375. Image regions 365 having a low local scene brightness level will typically have a lower signal-to-noise level. As a result, there will be a higher level of uncertainty in the magnitude of the determined local motion velocity 375. In some embodiments, a weighting factor can be used where local motion velocities 375 from image regions 365 having a higher local scene brightness level are weighted more highly than those from image regions 365 having a lower local scene brightness level.

The various weighting factors used to determine the weighting coefficients $w_i$ can be combined in any way known in the art. In a preferred embodiment, the various factors are multiplied together, and the resulting values are scaled so that they sum to one. For example, the weighting coefficients $w_i$ can be determined using the following equation:

$$w_i = \frac{w_{i,p} w_{i,d} w_{i,b} w_{i,c}}{\sum_i w_{i,p} w_{i,d} w_{i,b} w_{i,c}} \qquad (7)$$

where $w_{i,p}$ is a weighting factor for the $i^{th}$ image region determined as a function of the position of the image region, $w_{i,d}$ is a weighting factor for the $i^{th}$ image region determined as a function of the image detail of the image region, $w_{i,b}$ is a weighting factor for the $i^{th}$ image region determined as a function of the image brightness of the image region, and $w_{i,c}$ is a weighting factor for the $i^{th}$ image region determined as a function of the relative confidence level associated with the local motion velocity.

In many cases, particularly for low brightness scenes having little motion, a single motion velocity 325 (FIG. 4) determined from two preview images 315 can have a relatively high degree of uncertainty. The uncertainty is partly due to random variability, but can also arise from temporally varying sources of motion that cannot be adequately characterized by a single measurement. In a preferred embodiment, motion velocity values are determined at a series of different capture times, and a time-average of the motion velocity values is calculated to reduce the degree of uncertainty. In one implementation, this is accomplished by computing a series of motion velocity estimates using different preview images spaced at regular time intervals (e.g., every $1/10$ sec) as the reference image 410 (FIG. 6). A history of the most recent motion velocities (e.g., the 10 most recent motion velocities) are then stored in a memory. A combined time-averaged motion velocity is then determined by performing a weighted average of the stored motion velocities.

Because the relevance of a preview image in the motion velocity prediction is directly related to its temporal proximity to the capture time of the archival digital image 355, weighting coefficients for the weighted average calculation should be weighted according to the capture time. In general, the longer the time difference between the capture time of the preview image used for motion velocity estimation and that of the archival frame, the lower the assigned weighting coefficient.

Figure 10:
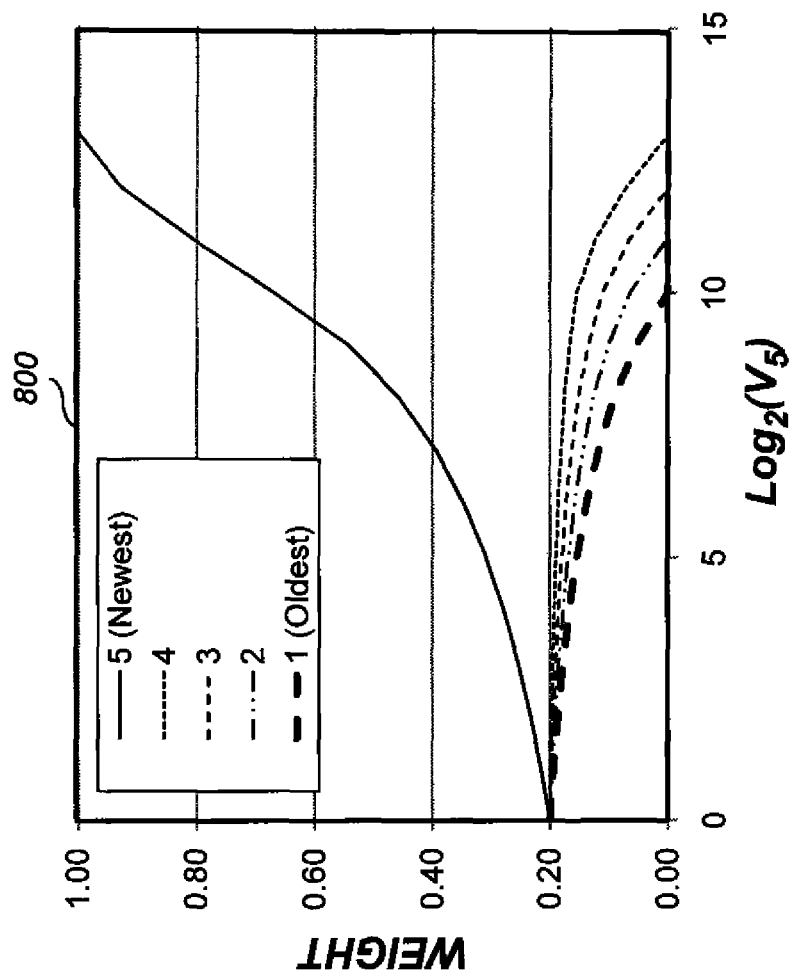
FIG. 10 is a graph illustrating weighting coefficients useful for calculating a time-averaged motion velocity.

In some embodiments, the weighting coefficients used for the different capture times can also be a function of the motion velocity estimate made immediately prior to capturing the archival digital image. FIG. 10 shows a graph 800 illustrating a set of functions that can be used to calculate weighting coefficients according to one embodiment. In this case, a weighted average is computed using the five most recent motion velocity estimates ($V_1$-$V_5$). As the magnitude of the most recent motion velocity estimate ($V_5$) increases, the more highly it is weighted. In the limit were $V_5$ is large, only the most recent motion velocity estimate has a non-zero weight. However, if the most recent motion velocity estimate indicates a low level of motion, a longer time base is required to verify that the scene is truly static. In this case, more motion velocity estimates are included in the weighted average, and higher weights will be assigned to the earlier motion velocity estimates.

In some embodiments, the weighting coefficients used for the different capture times can be determined responsive to the overall scene brightness level. In general, digital images captured of scenes having a lower scene brightness level will require longer exposure times. Therefore, it can be advantageous to use a longer time base to calculate the time-averaged motion velocity in order to ensure that the longer exposure times are acceptable. This can be done by increasing the weighting of the older motion velocity estimates, or by computing the time average motion velocity over a longer time interval (either by averaging over a larger number of motion velocity estimates, or by using larger time intervals between the motion velocity estimates).

The quality of any single motion vector calculation is affected by the signal-to-noise ratio of the image data. Often for preview images with low signal-to-noise ratios, it is impossible to compute a motion value close to zero even where no motion exists. This is a consequence of small random errors producing differences between the captured preview images. Therefore, the motion velocity will be larger than it should be due to the presence of the random noise. To compensate for this, the determined motion velocity can be reduced accordingly. In one embodiment, the motion velocity V can be adjusted using the following equation:

$$V' = \sqrt{V^2 - V_N^2} \quad (8)$$

where $V_N$ is a noise compensation value representing an estimate of the motion velocity bias introduced by the random noise, and V' is the adjusted motion velocity.

Figure 11:
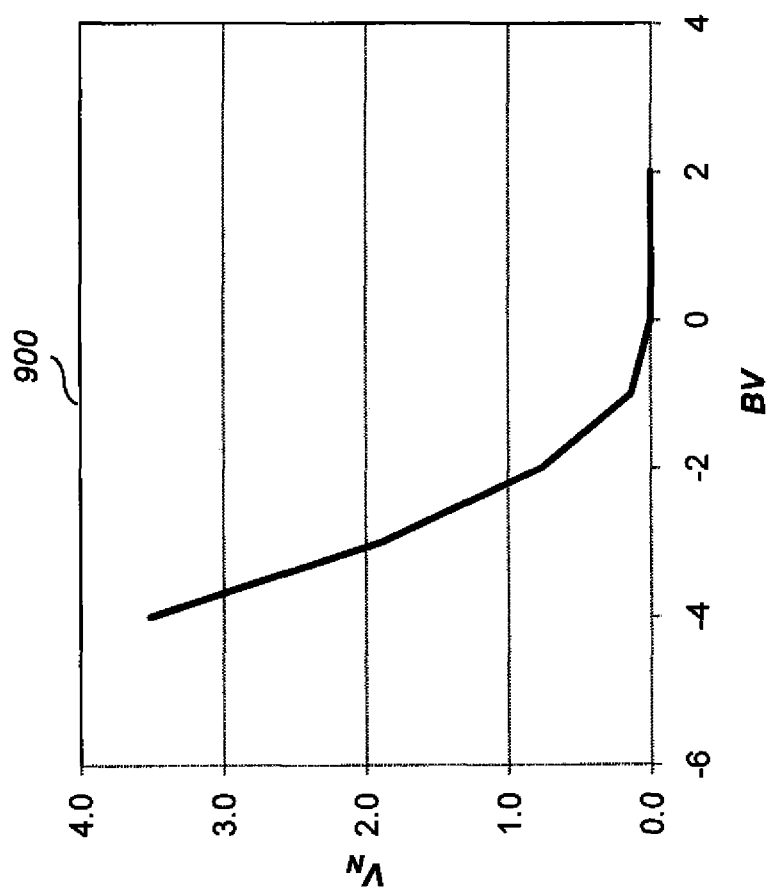
FIG. 11 is a graph of a noise compensation value as a function of a scene brightness value.

A relationship between the overall scene brightness level and $V_N$ can be characterized experimentally. FIG. 11 illustrates a graph 900 showing the noise compensation value $V_N$ as a function of the overall scene brightness value BV for a particular configuration. The exact shape of the noise compensation function will be dependent on the characteristics of the particular image capture device, as well as the method used to calculate the motion velocity. In this example the noise compensation value $V_N$ is zero above a predefined threshold such that the motion estimates are only reduced for scene brightness values below the predefined threshold.

The above description has focused on embodiments where the captured digital image 355 (FIG. 4) is a digital still image. However, the above-described method for determining image capture settings can also be applied to applications where the captured digital image 355 is a frame in a digital video sequence. In this case, the determined motion velocity 325 can be updated at regular time intervals during the process of capturing the digital video sequence, and the determined image capture settings 345 can be updated accordingly.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
26 speaker
28 firmware memory
30 image memory
32 image display
34 user controls
36 display memory
38 wired interface
40 computer
44 video interface
46 video display
48 interface/recharger
50 wireless modem
52 radio frequency band
58 wireless network
70 Internet
72 photo service provider
90 white balance setting
95 white balance step
100 color sensor data
105 noise reduction step
110 exposure index setting
115 demosaicing step
120 resolution mode setting
125 color correction step
130 color mode setting
135 tone scale correction step
140 contrast setting
145 image sharpening step
150 sharpening setting
155 image compression step
160 compression mode setting
165 file formatting step
170 metadata
175 photography mode settings
180 digital image file
185 camera settings
200 exposure control system
210 assess scene brightness step
220 determine capture mode step
225 capture mode setting
230 determine exposure index step
235 exposure index setting
240 determine aperture step
245 aperture setting
250 determine exposure time step
255 exposure time setting
260 capture digital image step
265 digital image
270 image capture settings
310 capture preview images step
315 preview images
320 determine motion velocity step
325 motion velocity 330 assess scene brightness step
335 scene brightness
340 determine image capture settings step
345 image capture settings
350 capture digital image step
355 digital image
360 define image regions step
365 image regions
370 determine local motion velocities step
375 local motion velocities
380 determine combined motion velocity step
400 designate reference image step
405 non-reference images
410 reference image
425 extract image region step
430 reference image region
440 extract shifted image regions step
445 spatial offsets
450 shifted image regions
455 compute merit function values step
460 merit function values
465 image region
470 compute fitting function step
475 fitting function
480 determine motion velocity step
500 measured point
505 fitting function
510 minimum point
600 image region
605 face zone
610 image region
615 peripheral zone
620 image region
625 preview image
630 central zone
635 image region
705 fitting function
710 minimum point
715 fitting function
720 minimum point
800 graph
900 graph

The invention claimed is:

1. A method for determining image capture settings for an electronic image capture device, comprising:
capturing a set of at least two preview images of a scene at different capture times using the electronic image capture device;
using a processor to analyze the set of captured preview images to determine a combined motion velocity for the scene;
determining one or more image capture settings responsive to the combined motion velocity;
capturing an archival image with the electronic image capture device according to the determined image capture settings; and
storing the captured archival image in an image memory;
wherein the process of determining the combined motion velocity for the scene includes:
selecting a plurality of image regions corresponding to subsets of image pixels within the captured preview images, wherein at least one of the image regions is selecting by automatically analyzing the set of captured preview images;
determining local motion velocities for each of the image regions; and
combining the local motion velocities to determine the combined motion velocity.

2. The method according to claim 1 wherein at least one of the image regions corresponds to a focus region identified by an autofocus algorithm.

3. The method according to claim 1 wherein at least one of the image regions corresponds to a face region within the set of captured preview images, wherein the face region is detected by automatically analyzing the set of captured preview images.

4. The method according to claim 1 wherein at least one of the image regions corresponds to an image region determined to have a high scene brightness level.

5. The method according to claim 1 wherein at least one of the image regions corresponds to an image region determined to have a high level of scene detail.

6. The method according to claim 1 wherein at least one of the image regions corresponds to an image region where there is determined to be a large difference between the captured preview images in the set of captured preview images.

7. The method according to claim 1 wherein at least one of the image regions has a predefined location.

8. The method according to claim 1 wherein the combined motion velocity is determined by forming a weighted combination of the local motion velocities, each local motion velocity being weighted with a weighting coefficient.

9. The method according to claim 8 wherein the weighting coefficient for at least some of the local motion velocities is determined responsive to an estimate of an accuracy to which the local motion velocity was determined.

10. The method according to claim 1 wherein local motion velocities are determined using sets of preview images captured at a plurality of different capture times, and wherein the combined motion velocity is determined by combining the local motion velocities determined at the different capture times.

11. The method according to claim 10 wherein the local motion velocities for sets of preview images captured at more recent capture times are weighted more highly than the local motion velocities for sets of preview images captured at earlier capture times.

12. The method according to claim 1 wherein the image capture settings include a capture mode setting, an exposure index setting, an aperture setting or an exposure time setting, or combinations thereof.

13. The method according to claim 12 wherein shorter exposure time settings are determined for preview images having a larger combined motion velocity relative to preview images having a smaller combined motion velocity.

14. The method according to claim 1 wherein the image capture settings include parameters used to control one or more image processing operations applied to the archival digital image.

15. The method according to claim 1 wherein the local motion velocities are determined by
designating one of the preview images as a reference preview image, and the rest of the preview images to be non-reference preview images;
designating an image region within the preview images, wherein the image region includes at least a subset of image pixels in the preview images;
shifting the image regions within the non-reference preview images according to each of a plurality of spatial offsets relative to the image region within the reference preview image to determine a plurality of shifted image regions, wherein the spatial offsets include horizontal and vertical offset values, each of which correspond to an integer number of image pixels;

using a data processor to compute merit function values for each of the spatial offsets, wherein the merit function values are an indication of an amount of difference between the image region in the reference preview image and the shifted image regions in the non-reference digital images;

determining a particular spatial offset that substantially minimizes the difference between the image region in the reference preview image and the shifted image regions in the non-reference digital images responsive to the computed merit function values; and determining the motion estimate responsive to the determined particular spatial offset.

16. The method according to claim 15 wherein the determination of the particular spatial offset includes:

using a data processor to fit a fitting function having a predefined functional form to at least a subset of the computed merit function values, wherein the fitting function provides an estimated merit function value as a function of spatial offset; and determining the particular spatial offset responsive to the determined fitting function, wherein the particular spatial offset is a non-integer spatial offset.

* * * * *